Figure 1:
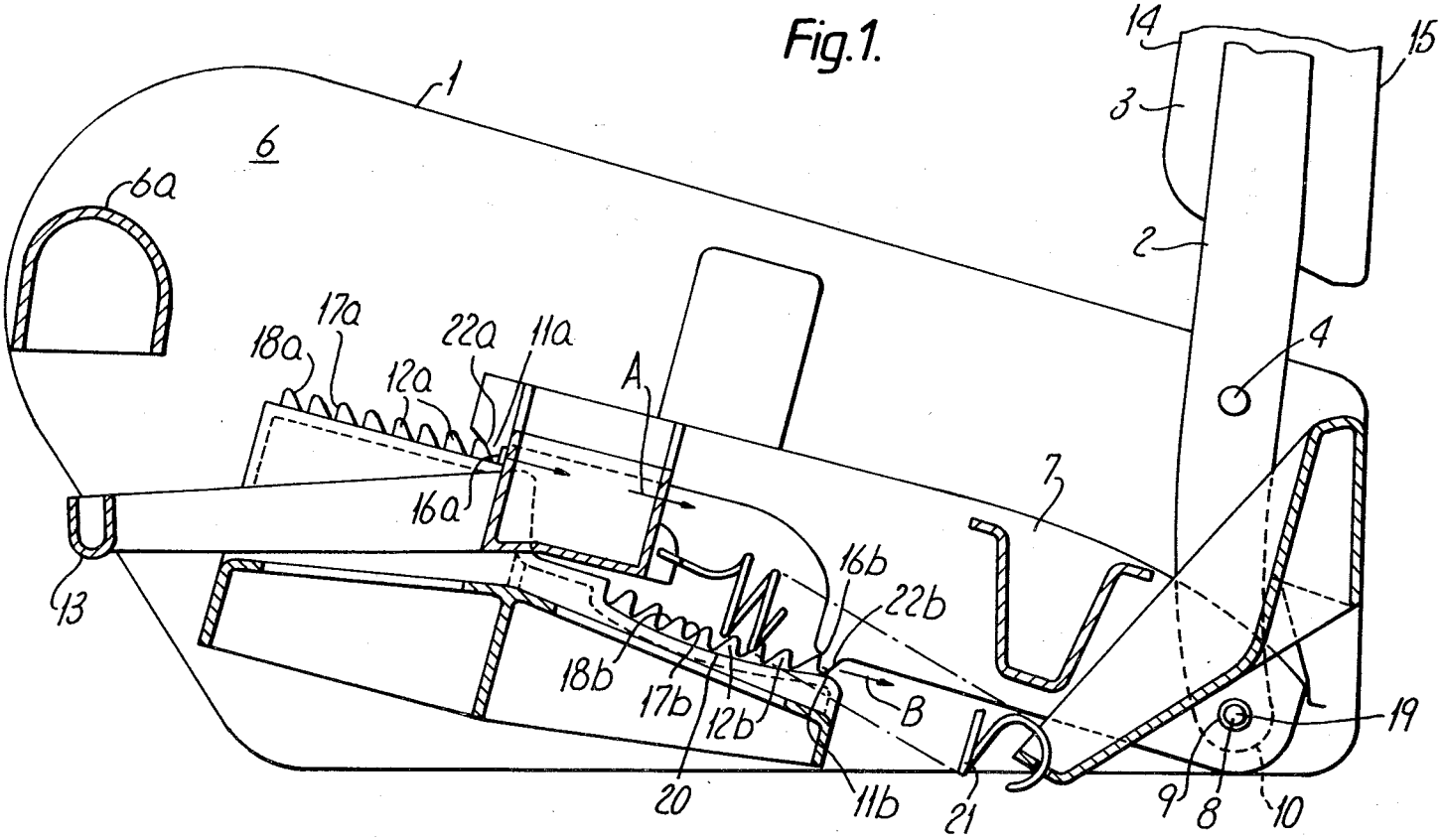
Figure 2:
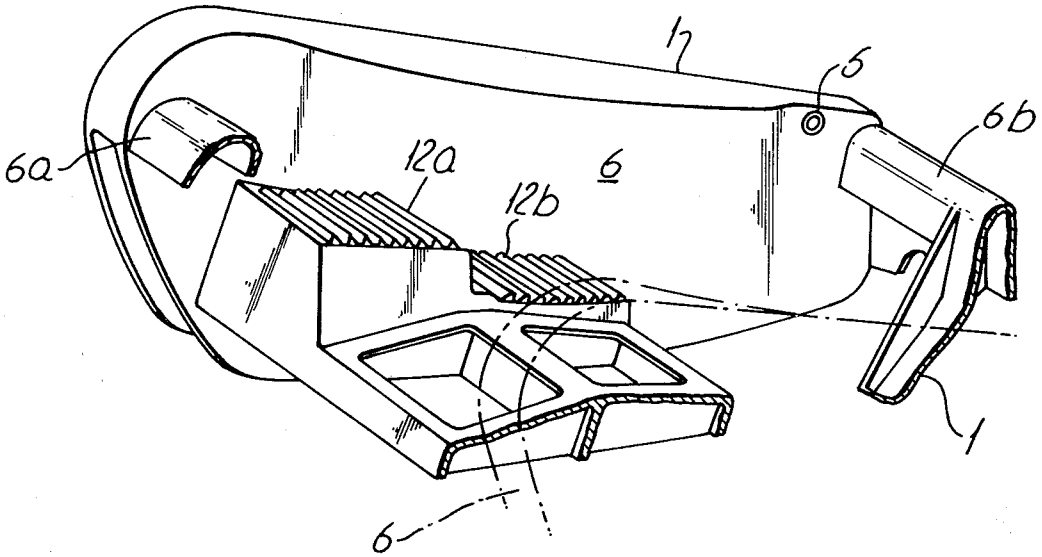
Figure 3:
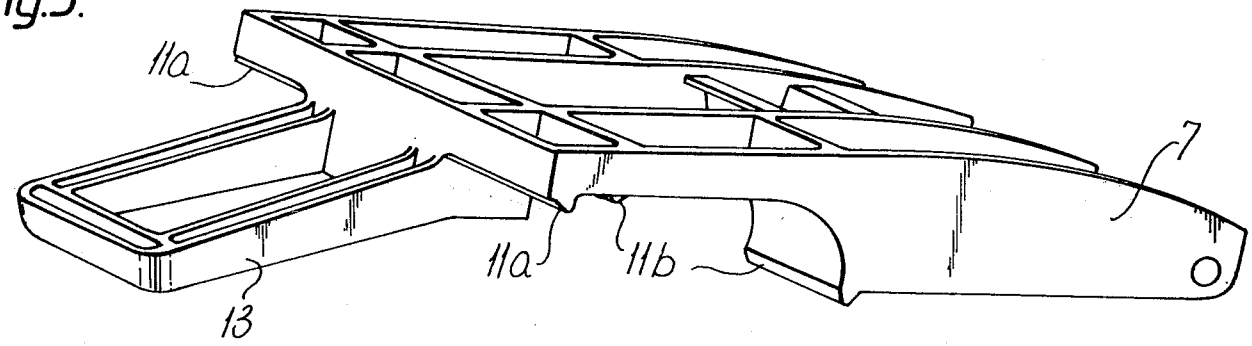
Figure 4A:
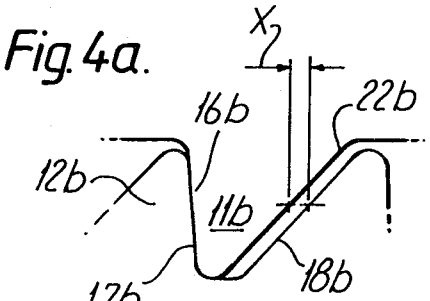
Figure 4B:
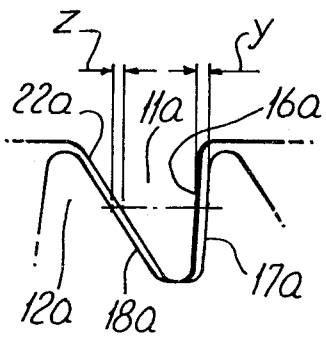
Figure 5:
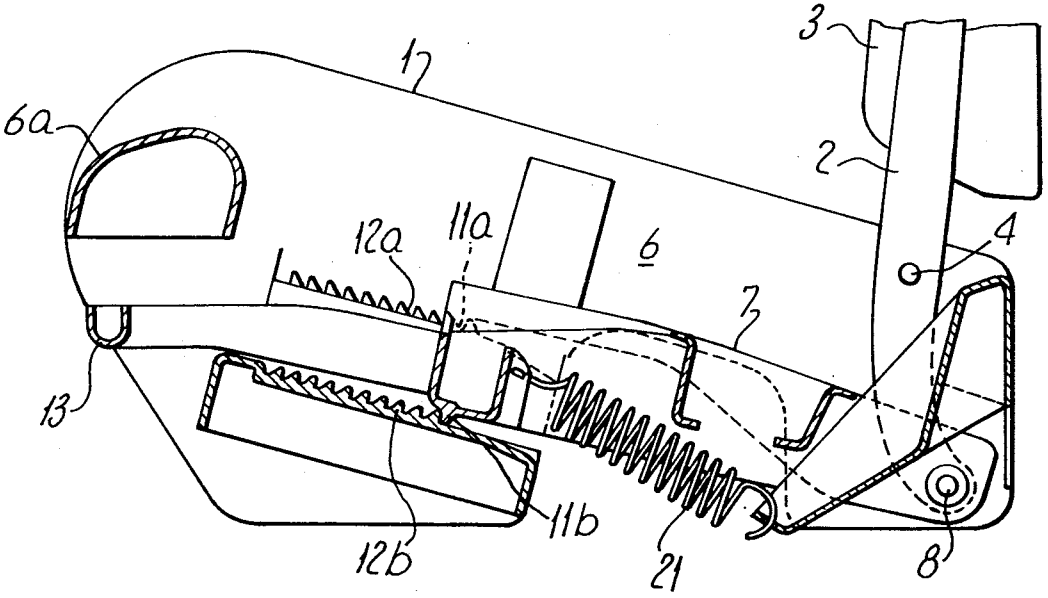

United States Defensive Publication [19] (H) [11] T103,201

Robinson [43] Jul. 5, 1983

[54] ADJUSTABLE RECLINE-CONTROL MECHANISM FOR FURNITURE AND FURNITURE COMPRISING THE MECHANISM

[76] Inventor: James D. Robinson, 3 The Jinnings, Welwyn Garden City, Hertfordshire, England

[21] Appl. No.: 328,391

[22] Filed: Dec. 7, 1981

[30] Foreign Application Priority Data

Dec. 31, 1980 [GB] United Kingdom ..... 8041570

[51] Int. Cl.[3] ..... A47C 1/025

[52] U.S. Cl. ..... 297/367; 297/369; 297/371

[57] ABSTRACT

An adjustable recline-control mechanism for furniture of the type comprising a carrier for an occupant, e.g. a seat-pan and a support e.g. a back-rest, reclinable relative to the carrier wherein the angle of recline is controlled by the mechanism which comprises a link one end of which is pivotally connected to the support while the other end is latchable by at least two co-operating latching portions which respectively prevent travel of the link in opposite directions, the respective latching portions being spaced apart relative to the pivot axis of the link such that a jolt to the front or back of the support exerts on the link a moment which biasses the link towards latching irrespective of the direction of the jolt. Each latching portion suitably comprises a fixed toothed array and a cooperable displaceable tooth array, at least one tooth in each array comprising a thrust face and the teeth being arranged so that projections normal to a thrust face in each of the latching portions pass respectively on opposite sides of the pivot axis of the link. The mechanism is suitably incorporated into furniture, especially a motor vehicle seat, and is of utility in household and garden furniture.

9 Claims, 4 Sheets Drawing,

13 Pages Specification

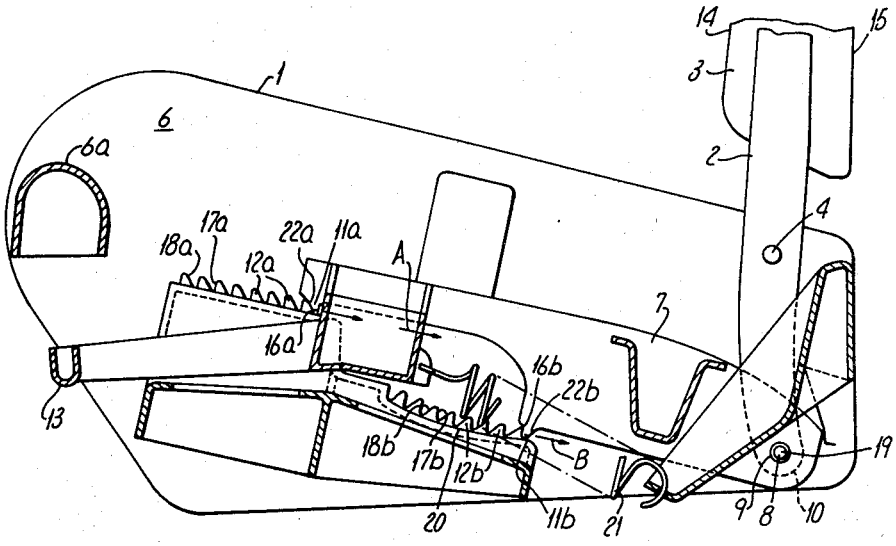

The file of this unexamined application may be inspected and copies thereof may be purchased (849 O.G. 1221, Apr. 9, 1968).